No. 759,066. PATENTED MAY 3, 1904.
A. G. BETTS.
ELECTRIC STORAGE BATTERY.
APPLICATION FILED AUG. 17, 1903.
NO MODEL. 2 SHEETS—SHEET 2.
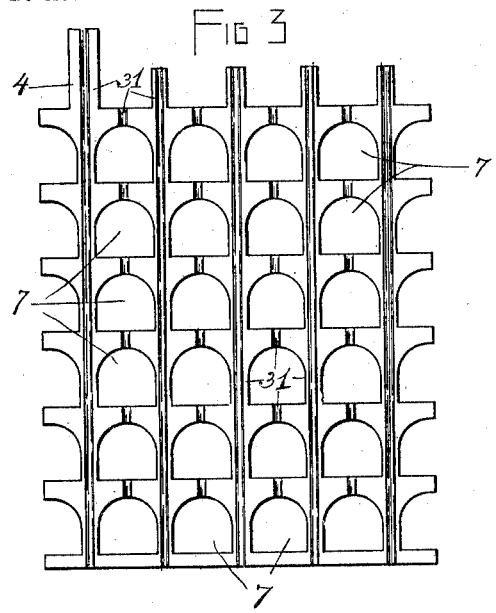
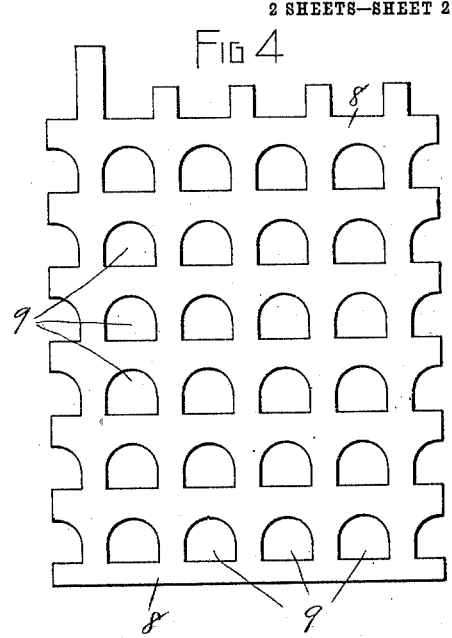
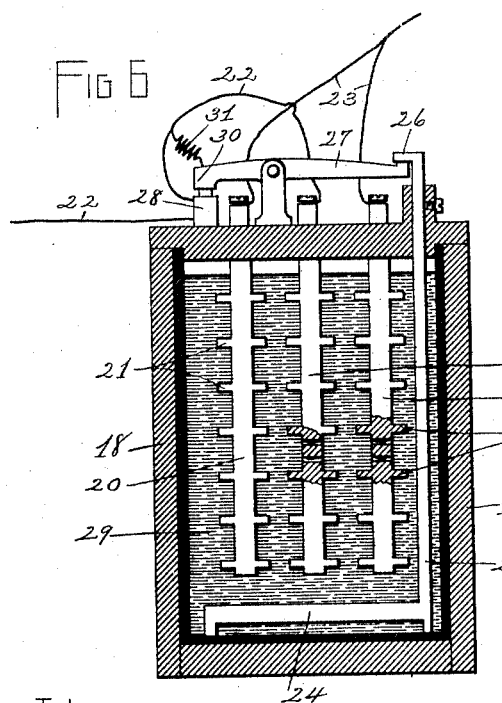
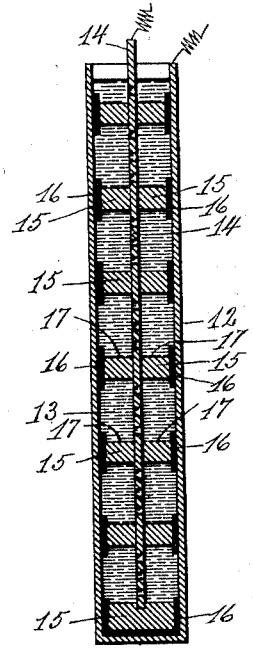
WITNESSES
S. C. Booth.
E. M. O'Reilly.
INVENTOR
Anson G. Betts
By Mosher & Curtis
attys.

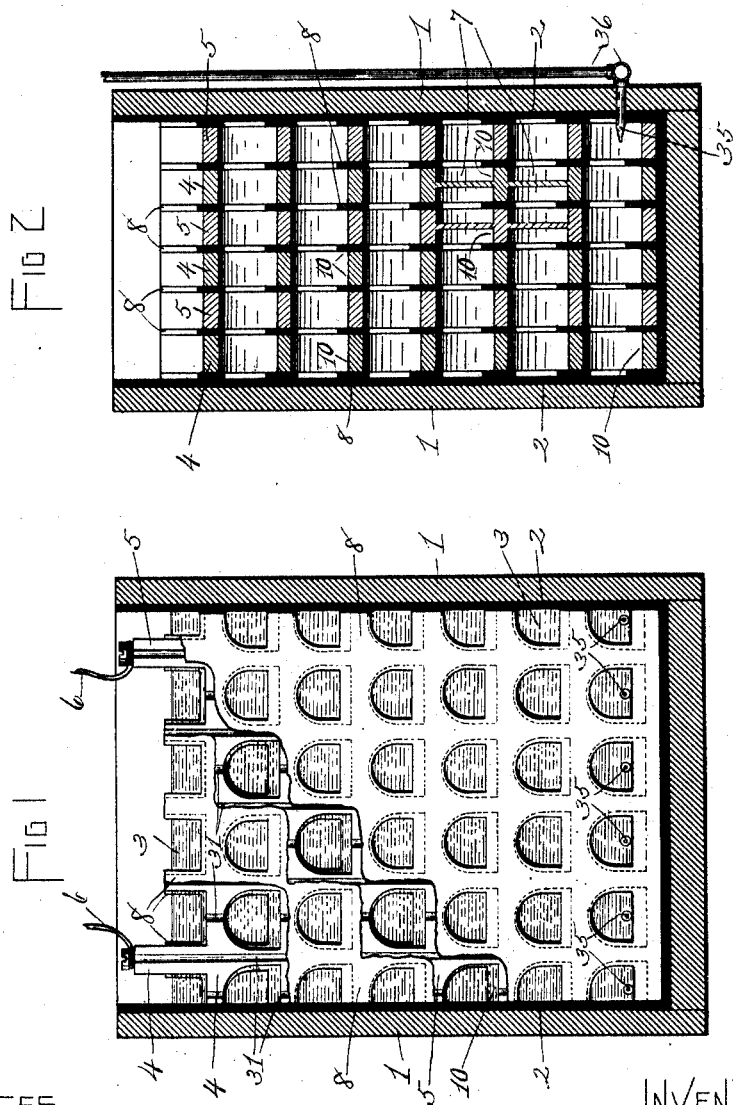

No. 759,066.

Patented May 3, 1904.

UNITED STATES PATENT OFFICE.

ANSON GARDNER BETTS, OF TROY, NEW YORK.

ELECTRIC STORAGE BATTERY.

SPECIFICATION forming part of Letters Patent No. 759,066, dated May 3, 1904.

Application filed August 17, 1903. Serial No. 169,718. (No model.)

*To all whom it may concern:*

Be it known that I, ANSON GARDNER BETTS, a citizen of the United States, residing at Troy, county of Rensselaer, and State of New York, have invented certain new and useful Improvements in Electric Storage Batteries, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a view in vertical cross-section of my improved storage battery in its preferred form. Fig. 2 is a similar view taken on a plane at right angles to the plane of Fig. 1, certain of the electrodes and insulating-mats being broken away in part. Fig. 3 is a side view of one of the electrode elements. Fig. 4 is a similar view of one of the insulating-mats. Fig. 5 is a vertical cross-section of a modified form of battery-cell. Fig. 6 is a vertical cross-section of another form of battery-cell.

Certain objects of my invention are to store electrical energy in an apparatus that admits of more varied conditions of use than is desirable with the types of storage battery in general use and to secure greater economy in the construction and use of such an apparatus.

Other objects of my invention will appear in connection with the following description.

In the preferred form of my improved storage battery I employ solid graphite electrodes in contact with an electrolyte comprising a solution of a lead salt of a non-oxidizing and non-oxidizable acid with or without the corresponding salt of another metal more readily electrolytically deposited than lead, such as a strong solution of lead fluosilicate containing some free acid or a somewhat-acid solution of fluosilicates of lead and another metal, as copper, capable of being deposited by electrolysis practically free from lead from such solution. I have found by experiment and use of such a storage battery that on passing an electric current of moderate strength through such an electrolyte with such electrodes peroxid of lead is deposited on one electrode in a dense adherent and well-conductant form, while metallic lead or said other metal is deposited on the other electrode, free fluosilicic acid remaining in solution. When the electrodes of the charged battery are connected in circuit to generate electrical energy, the lead or said other metal and lead peroxid are restored to their original condition by combination with the free fluosilicic acid in the solution, restoring the battery to substantially its original condition. For convenience in referring to the separate electrodes I term the electrode upon which peroxid is deposited the "positive" electrode and the other the "negative" electrode. I also refer to each electrode as a single-pole element for convenience in describing the apparatus, but wish it to be understood that in my improved battery any desired number of positive-pole elements and any desired number of negative-pole elements may be employed in accordance with the capacity desired for the cell. For charging the cell a rate of from ten to twenty ampers per square foot of negative-electrode surface is suitable, the potential required being about two volts. The discharge may be conducted at a very high rate without injury to the cell.

A concentrated aqueous solution of lead fluosilicate at the ordinary summer temperature contains per liter about nine hundred grams of lead combined with six hundred and thirty-five grams of fluosilicic acid with a specific gravity of about 2.38. By the use of this solution, of which about twenty pounds represents a storage capacity of one electrical horse-power hour, and a suitable construction of electrodes and cell I am able to produce a battery of high storage capacity per unit of weight. When the electrolyte comprises a solution of lead fluosilicate peroxid of lead is deposited on the positive electrode and metallic lead upon the negative electrode by electrolysis during the charging operation. When the electrolyte comprises a solution of fluosilicates of lead and copper in chemicallyequivalent quantities, peroxid of lead is deposited on the positive electrode and metallic copper on the negative electrode during the charging operation. Copper fluosilicate has the necessary solubility for use in an electrolyte for this purpose. The greater tendency of copper to deposit in solid form is an advantage of its use. The lead peroxid on the positive electrode during the period of discharge shows a tendency to become soft and assume a brown color instead of its original brilliant black, and at the end of the discharge some of this material may not be so firmly attached to the electrode as to be in good electrical connection therewith. If under such circumstances the battery be subjected to a charging-current in the opposite direction from that last employed, the complete removal of any loosely-attached pieces of peroxid may be obtained with a resultant better adherence of the deposit subsequently formed. By employing electrodes both of which are insoluble, as electrodes of graphite, I am able to thus charge the battery at certain times in one direction and at other times in the opposite direction.

I prefer to use an exciting solution which has been very carefully freed from foreign metals that can deposit with the lead or other metal to be deposited on the negative electrode in order to insure well-adherent deposits of both peroxid and metal. The desired degree of purity can be obtained by depositing from the solution a large amount of lead or other metal to be deposited on the negative electrode, using a soluble anode of lead or said other metal, whereby the deposited metal gradually carries out with it the metallic impurities. The desired result can also be secured with less ease by crystallization of lead fluosilicate. More or less circulation of the solution is caused by the difference in density of the electrolyte from the different electrodes during the action of the battery. The circulation of the electrolyte can be increased, if desired, by any of the known mechanical means or by the introduction from time to time of bubbles of air into the solution at the bottom of the cell.

In operating my storage battery a small amount of gas is given off from the positive electrode, especially during the first few minutes of charging, until the graphite has been evenly coated with peroxid of lead. The result is that after the battery is completely discharged a small amount of metal still remains undissolved on the negative electrode. The amount is very small, but it gradually accumulates until with a very large number of operations the amount of lead or other metal permanently removed from the solution is considerable. The introduction of air for circulation purposes corrects this by dissolving small amounts of metal from the well-known reaction between dissolved oxygen, metal, and an acid forming a soluble salt with the metal.

I have found in working a storage battery constructed as above described that a small quantity of lead peroxid separates from the positive electrode particularly during discharge and that the same phenomenon may occur with the metallic deposit.

Features of this invention consist in providing the electrodes with surfaces from which the separation of the electrodeposit takes place less easily and in providing means whereby any of the electrodeposit which becomes thus separated from an electrode is caught and maintained in circuit during the discharge of the battery, such deposits being thus dissolved and restored to their original condition in solution, thereby retaining the strength of the electrolyte. For this purpose it is only necessary that the deposit so separated from the electrodes should be maintained in electrical connection with either a positive or a negative pole element of the battery. In order to secure the full efficiency of the discharge, the peroxid thus separated from its electrode should be retained in contact with a positive-pole element and the metallic deposit so separated in contact with a negative-pole element. However, by collecting separated peroxid on a negative-pole element or separated metallic deposit on a positive-pole element a resolution of such deposits will be accomplished. Any known means may be employed for thus catching and maintaining in circuit during the discharge of the battery deposits separated from the electrodes, adapted, preferably, to maintain the separated lead peroxid in contact with a positive-pole element and the separated metal in contact with a negative-pole element of the battery.

For certain purposes of this invention a solution of metallic salts of various non-oxidizing and non-oxidizable acids may be employed, including fluorine acids—such as fluoboric acid, fluotitanic acid, fluosilicic acid, and others—and for certain purposes of the invention electrodes of material other than graphite may be employed—such as carbon, platinum, or other insoluble material— for one or both electrodes or the combination of an insoluble positive electrode with a negative electrode of copper, silver, or other metal of less electromotive force of solution than the metallic deposit. I prefer, however, to use solid graphite, and more particularly artificial graphite, for the electrodes, for the reason that their use insures a more firm adherence of the electrodeposit than the other substances named.

By the terms "non-oxidizable" and "non-oxidizing" acid I mean acids which are not oxidized or reduced by conditions obtained in working the battery.

Referring to the figures of the drawings, 1 represents the body of the cell, which may be formed of wood, provided with a rubber lining 2, within which are contained the electrolyte 3 and a plurality of positive-electrode elements 4, arranged in alternation with a plurality of negative-electrode elements 5, adapted to be connected in circuit by means of the wires 6 in the usual manner. The electrolyte is prepared as above described. Each of the electrode elements comprises a grating of artificial graphite with numerous openings 7 therein permitting free circulation of the electrolyte. Plates or mats 8 of insulating material, such as rubber, are supported on opposite sides of each electrode element, so as to cover the vertical side surfaces of the gratings and prevent the formation of electrodeposit thereupon. These mats are provided with apertures 9, corresponding in location with but of smaller area than the respective apertures in the electrodes interposed between said mats. The apertures in the mats permit the circulation therethrough of the electrolyte; but the bodies of the mats where projecting upwardly above the bottom wall of the several apertures in the electrodes serve to form in the bottom of each electrode-aperture a pocket 10, adapted to catch falling detached electrodeposit and retain the same in contact with the body of the electrode. The insulating-mats also cover the side surfaces of the electrode at the corners bordering the apertures therein, thus preventing the formation on such corners of a growth of electrodeposit, which might tend to short-circuit the battery.

In Fig. 5 I have shown a copper tank 12, which forms the negative electrode, within which are contained the electrolyte 13 and the positive electrode 14 in the form of a perforated plate of graphite. Blocks of graphite 15 may be interposed at intervals between said graphite plate and the side walls of the copper tank from which they are insulated by rubber blocks 16, said graphite blocks forming in connection with the graphite plate pockets 17, adapted to catch the falling detached electrodeposit and retain the same in contact or electrical connection with the positive-pole element.

In Fig. 6, 18 represents the body of the cell; 19, the positive electrode; 20, the negative electrodes, and 29 the electrolyte. These electrodes are perforated plates of graphite formed with ribs or flanges 21, extending horizontally along their sides, adapted to receive loosened electrodeposit and retain the same in contact with the electrode. The electrodes are adapted to be connected in circuit by the respective wires 22 and 23. Beneath the electrodes is placed a graphite plate 24, adapted to receive any loosened electrodeposit which fails to be caught by the flanges 21, which plate is in electrical connection through the rod 25 with the contact-piece 26, adapted to be engaged at certain times by one end of the contact-lever 27, the opposite end of which constitutes an armature for the electromagnet 28 in circuit with the wire 22. The construction is such that when the battery is subjected to a charging-current the armature end 30 of the contact-lever 27 is released or repelled by the magnet, causing separation of said lever from the contact 26, and thereby cutting the plate 24 out of circuit during the charging of the battery. When the battery is employed as a generator, the magnet 28 is energized to attract the armature end 30 of the contact-lever, causing the same to engage the contact 26, thereby connecting in circuit the graphite plate 24 through the lever 27 and wire 31, which connect said lever with the wire 22. In the construction shown in Figs. 1, 2, and 3 the side surfaces of the electrodes may be formed with vertical grooves 31, adapted to permit the free discharge upwardly through the cell of bubbles of gas.

As a means for introducing air into the electrolyte for the purpose above stated I have shown in Figs. 1 and 2 a series of air-supply nozzles 35, projecting into the bottom portion of the cell, which nozzles are connected exteriorly of the cell with a common air-supply pipe 36, communicating with a source of air-supply, such as an air-pump. (Not shown.)

In the construction shown in Figs. 1, 2, 3, and 4 the apertures in the electrodes may be formed to extend entirely through or only partly through the electrodes, both forms being shown in Fig. 2.

I make no claim in this application to the method of accumulating and using electrical energy disclosed herein, as the same forms the subject-matter of a separate application filed herewith.

What I claim as new, and desire to secure by Letters Patent, is—

1. In an electric storage battery, the combination with suitable electrodes, of a solution of a lead salt of a non-oxidizing and non-oxidizable acid, which forms a readily-soluble salt with lead.

2. In an electric storage battery, the combination with suitable electrodes, of a solution of a readily-soluble lead salt of a fluorin acid.

3. In an electric storage battery, the combination with suitable electrodes, of a solution of lead fluosilicate.

4. In an electric storage battery, the combination with suitable electrodes one of which is insoluble, of a solution of a lead salt of a non-oxidizing and non-oxidizable acid, which forms a readily-soluble salt with lead.

5. In an electric storage battery, the combination with suitable electrodes one of which is insoluble, of a solution of a lead salt of a fluorin acid.

6. In an electric storage battery, the combination with suitable electrodes one of which is insoluble, of a solution of lead fluosilicate.

7. In an electric storage battery, the combination with electrodes, one of which is of graphite; of an aqueous solution of a readily-soluble lead salt of a non-oxidizing and non-oxidizable acid.

8. In an electric storage battery, the combination with electrodes, one of which is of graphite, of a solution of a lead salt of a fluorin acid.

9. In an electric storage battery, the combination with electrodes, one of which is of graphite, of a solution of lead fluosilicate.

10. In an electric storage battery, the combination with insoluble electrodes, of a solution of a lead salt of a non-oxidizing and non-oxidizable acid which forms a readily-soluble salt with lead.

11. In an electric storage battery, the combination with insoluble electrodes, of a solution of a lead salt of a fluorin acid.

12. In an electric storage battery, the combination with insoluble electrodes, of a solution of lead fluosilicate.

13. In an electric storage battery, the combination with electrodes of graphite; of an aqueous solution of a readily-soluble lead salt of a non-oxidizing and non-oxidizable acid.

14. In an electric storage battery, the combination with electrodes of graphite; of a solution of lead salt of a fluorin acid.

15. In an electric storage battery, the combination with electrodes of graphite, of a solution of lead fluosilicate.

16. In an electric storage battery, the combination with suitable electrodes, of a solution of readily-soluble salts of lead, and another metal capable of being electrodeposited practically free from lead from said solution.

17. In an electric storage battery, the combination with suitable electrodes, of a solution of fluorin acid salts of lead, and another metal capable of being electrodeposited practically free from lead from said solution.

18. In an electric storage battery, the combination with suitable electrodes; of a solution of fluosilicates of lead, and another metal capable of being electrodeposited from said solution practically free from lead.

19. In an electric storage battery, the combination with suitable electrodes; of a solution of readily-soluble lead and copper salts of a non-oxidizing and non-oxidizable acid.

20. In an electric storage battery, the combination with suitable electrodes; of a solution of lead and copper salts of a fluorin acid.

21. In an electric storage battery, the combination with suitable electrodes; of a solution of lead and copper fluosilicates.

22. In an electric storage battery, the combination with electrodes of graphite; of a solution of readily-soluble lead and copper salts of a non-oxidizing and non-oxidizable acid.

23. In an electric storage battery, the combination with electrodes of graphite; of a solution of lead and copper salts of a fluorin acid.

24. In an electric storage battery, the combination with electrodes of graphite; of a solution of lead and copper fluosilicates.

25. In an electric storage battery, having, in combination with suitable electrodes, an electrolyte from which active materials are deposited upon the respective electrodes on charging, and which redissolves said active materials on discharging, a conductive receptacle disposed to catch falling detached active material in combination with means whereby said receptacle is maintained in circuit during the discharge of the battery.

26. In an electric storage battery, having, in combination with suitable electrodes, an electrolyte from which on charging are deposited upon the respective electrodes lead peroxid and lead, or equivalent metal, both of which active materials are redissolved on discharge; a conductive receptacle disposed to catch falling detached active material, in combination with means whereby said receptacle is maintained in circuit during the discharge of the battery.

27. In an electric storage battery, having, in combination with suitable electrodes, an electrolyte from which active materials are deposited upon the respective electrodes on charging, and which redissolves said active materials on discharging, an electrode of solid graphite having numerous small surfaces arranged at angles one to another.

28. In an electric storage battery, having, in combination with suitable electrodes, an electrolyte from which active materials are deposited upon the respective electrodes on charging, and which redissolves said active materials on discharging, an insoluble electrode provided with laterally-extending surfaces disposed to catch and hold in electrical connection with the electrode detached falling active material.

29. In an electric storage battery, having in combination with suitable electrodes, an electrolyte from which active materials are deposited upon the respective electrodes on charging, and which redissolves said active materials on discharging; an insoluble electrode formed with side apertures in combination with insulating material applied to the side surface of said electrode covering said side surface at the corner edges bordering said apertures.

30. In an electric storage battery, having, in combination with suitable electrodes, an electrolyte from which active materials are deposited upon the respective electrodes on charging, and which redissolves said active materials on discharging; an electrode of graphite having laterally-extended surfaces adapted to catch and hold in electrical connection with said electrode detached active material.

31. In an electric storage battery, having, in combination with suitable electrodes, an electrolyte from which active materials are deposited upon the respective electrodes on charging, and which redissolves said active materials on discharging, an insoluble electrode provided with apertures in its opposite sides, in combination with apertured plates of insulating material located on opposite sides thereof, the apertures in said insulating-plates corresponding in location with and being of less area respectively than those in the interposed electrode.

32. In an electric storage battery, the combination with an electrolyte containing in solution a lead salt of a non-oxidizing and non-oxidizable acid which forms a readily-soluble salt with lead; of electrodes in contact with said electrolyte, one of said electrodes comprising an apertured plate of insoluble conductive material; and plates of insulating material located on opposite sides of said electrode provided with apertures respectively corresponding in location with, but smaller than those in the interposed electrode, whereby the edges of the electrode bordering the apertures therein are covered and protected from an excess of electrodeposit by the insulating-plates, and pockets are formed in the bottoms of the respective apertures in the electrode between neighboring insulating-plates adapted to receive and retain detached electrodeposit formed during the operation of the battery.

33. In an electric storage battery, the combination with suitable electrodes, and an electrolyte from which active materials are deposited upon the respective electrodes on charging, and which redissolves said active materials on discharging; of means for introducing air into the electrolyte near the bottom of the cell.

34. In an electric storage battery, the combination with insoluble electrodes; and an electrolyte comprising a solution of a lead salt of a non-oxidizing and non-oxidizable acid which forms a readily-soluble salt with lead; of means for introducing air into the electrolyte near the bottom of the cell.

In testimony whereof I have hereunto set my hand this 15th day of August, 1903.

ANSON GARDNER BETTS.

Witnesses:
 FRANK C. CURTIS,
 E. M. O'REILLY.